United States Patent
Kim

(10) Patent No.: US 8,780,087 B2
(45) Date of Patent: Jul. 15, 2014

(54) OPTICAL TOUCH SCREEN

(76) Inventor: Sung-Han Kim, Seoul (KR)

( * ) Notice: Subject to any disclaimer, the term of this patent is extended or adjusted under 35 U.S.C. 154(b) by 68 days.

(21) Appl. No.: 13/491,669

(22) Filed: Jun. 8, 2012

(65) Prior Publication Data

US 2012/0299879 A1 Nov. 29, 2012

Related U.S. Application Data

(63) Continuation of application No. PCT/KR2010/008728, filed on Dec. 8, 2010.

(30) Foreign Application Priority Data

Dec. 11, 2009 (KR) .................. 10-2009-0123099
Dec. 7, 2010 (KR) .................. 10-2010-0123939

(51) Int. Cl.
*G06F 3/042* (2006.01)
*G06F 3/041* (2006.01)
*G02F 1/1335* (2006.01)

(52) U.S. Cl.
CPC ........... *G06F 3/0428* (2013.01); *G06F 3/0416* (2013.01); *G02F 1/133615* (2013.01)
USPC ...................................... 345/175

(58) Field of Classification Search
CPC ... G02F 1/00; G02F 1/133615; G02B 6/0001; G06F 2203/04104; G06F 3/0428; G06F 3/0416; G06F 2203/041
See application file for complete search history.

(56) References Cited

U.S. PATENT DOCUMENTS

| | | | | |
|---|---|---|---|---|
| 5,969,343 A * | 10/1999 | Nakamura et al. | ....... | 250/227.31 |
| 6,563,491 B1 * | 5/2003 | Omura | ......... | 345/173 |
| 6,594,023 B1 * | 7/2003 | Omura et al. | ........ | 356/620 |
| 6,972,401 B2 * | 12/2005 | Akitt et al. | ........ | 250/221 |
| 7,302,156 B1 * | 11/2007 | Lieberman et al. | ........ | 385/146 |
| 7,599,520 B2 * | 10/2009 | Dempski et al. | ........ | 382/103 |
| 7,873,247 B2 | 1/2011 | Shimizu et al. | | |
| 8,243,048 B2 * | 8/2012 | Kent et al. | ........ | 345/177 |
| 8,339,378 B2 * | 12/2012 | Chtchetinine et al. | ........ | 345/175 |
| 2002/0033805 A1 * | 3/2002 | Fujioka et al. | ........ | 345/175 |
| 2006/0022962 A1 * | 2/2006 | Morrison et al. | ........ | 345/175 |
| 2008/0273019 A1 * | 11/2008 | Deane | ........ | 345/176 |
| 2008/0278460 A1 * | 11/2008 | Arnett et al. | ........ | 345/175 |
| 2009/0213093 A1 * | 8/2009 | Bridger | ........ | 345/175 |

(Continued)

FOREIGN PATENT DOCUMENTS

| | | | | | |
|---|---|---|---|---|---|
| JP | 56029204 A | * | 3/1981 | ............ | G02B 5/174 |
| JP | 2008-203431 A | | 9/2008 | | |

(Continued)

OTHER PUBLICATIONS

International Search Report issued Aug. 25, 2011, in counterpart International Application No. PCT/KR2010/008728 (5 pages including English translation).

*Primary Examiner* — Dwayne Bost
*Assistant Examiner* — Ivelisse Martinez Quiles
(74) *Attorney, Agent, or Firm* — NSIP Law

(57) ABSTRACT

The present invention relates to an optical touch screen which can recognize touch coordinates when the screen is touched by a finger, a touch pen, or the like. The optical touch screen comprises units for generating infrared light sources. A control unit calculates coordinates of an object being touched on the touch screen based on data detected by the infrared cameras.

10 Claims, 10 Drawing Sheets

(56) References Cited

U.S. PATENT DOCUMENTS

| | | | |
|---|---|---|---|
| 2010/0142223 A1* | 6/2010 | Suckling et al. | 362/615 |
| 2010/0295821 A1* | 11/2010 | Chang et al. | 345/175 |
| 2010/0315383 A1* | 12/2010 | Chang et al. | 345/175 |
| 2010/0328270 A1* | 12/2010 | Lin et al. | 345/175 |
| 2011/0141030 A1* | 6/2011 | Chen | 345/173 |
| 2012/0068974 A1* | 3/2012 | Ogawa | 345/175 |

FOREIGN PATENT DOCUMENTS

| | | | | |
|---|---|---|---|---|
| KR | 10-2008-0100008 A | | 11/2008 | |
| KR | 10-2009-0077771 A | | 7/2009 | |
| KR | 10-0910024 B1 | | 7/2009 | |
| KR | 1020080100111 | * | 7/2009 | G06F 3/041 |
| KR | 10-0942431 B1 | | 2/2010 | |
| KR | 10-2011-0023953 A | | 3/2011 | |
| WO | WO 2008/038275 A2 | | 4/2008 | |

* cited by examiner

FIG. 7

| POSITION NO. OF FINE LIGHT | θ | POSITION NO. OF FINE LIGHT | α | POSITION NO. OF FINE LIGHT | β |
|---|---|---|---|---|---|
| $d_1$ | $\theta_1$ | $b_n$ | $\alpha_1$ | $d_n$ | $\beta_1$ |
| $d_2$ | $\theta_2$ | $b_{n-1}$ | $\alpha_2$ | $d_{n-1}$ | $\beta_2$ |
| $d_3$ | $\theta_3$ | $b_{n-2}$ | $\alpha_3$ | $d_{n-2}$ | $\beta_3$ |
| . | . | . | . | . | . |
| . | . | . | . | . | . |
| . | . | . | . | . | . |
| $d_{n-1}$ | $\theta_{n-1}$ | $b_2$ | $\alpha_{n-1}$ | $d_2$ | $\beta_{n-1}$ |
| $d_n$ | $\theta_n$ | $b_1$ | $\alpha_n$ | $d_1$ | $\beta_n$ |
| $c_1$ | $\theta_{n+1}$ | $a_m$ | $\alpha_{n+1}$ | $a_1$ | $\beta_{n+1}$ |
| $c_2$ | $\theta_{n+2}$ | $a_{m-1}$ | $\alpha_{n+2}$ | $a_2$ | $\beta_{n+2}$ |
| $c_3$ | $\theta_{n+3}$ | $a_{m-2}$ | $\alpha_{n+3}$ | $a_3$ | $\beta_{n+3}$ |
| . | . | . | . | . | . |
| . | . | . | . | . | . |
| . | . | . | . | . | . |
| . | . | . | . | . | . |
| $c_{m-4}$ | $\theta_{n+m-4}$ | $a_5$ | $\alpha_{n+m-4}$ | $a_{m-4}$ | $\beta_{n+m-4}$ |
| $c_{m-3}$ | $\theta_{n+m-3}$ | $a_4$ | $\alpha_{n+m-3}$ | $a_{m-3}$ | $\beta_{n+m-3}$ |
| $c_{m-2}$ | $\theta_{n+m-2}$ | $a_3$ | $\alpha_{n+m-2}$ | $a_{m-2}$ | $\beta_{n+m-2}$ |
| $c_{m-1}$ | $\theta_{n+m-1}$ | $a_2$ | $\alpha_{n+m-1}$ | $a_{m-1}$ | $\beta_{n+m-1}$ |
| $c_m$ | $\theta_{n+m}$ | $a_1$ | $\alpha_{n+m}$ | $a_m$ | $\beta_{n+m}$ |

OPTICAL TOUCH SCREEN

CROSS-REFERENCE TO RELATED APPLICATION(S)

This application is a continuation of International Patent Application No. PCT/KR2010/008728, filed on Dec. 8, 2010, which claims the benefit of Korean Patent Application No. 10-2009-0123099, filed on Dec. 11, 2009, and Korean Patent Application No. 10-2010-0123939, filed on Dec. 7, 2010, in the Korean Intellectual Property Office, the entire disclosures of which are incorporated herein by reference for all purposes.

TECHNICAL FIELD

The present invention relates to an optical touch screen capable of recognizing touch coordinates when a screen is touched by a finger or a touch-pen.

BACKGROUND ART

With the development of a diversity of display devices such as a liquid crystal display (LCD), a touch screen has become popular as one of the most efficient input devices for use in facilitating an interface between a display device and a user. The touch screen enables a user to easily manipulate a variety of devices, for example, a computer, a mobile phone, a banking terminal, a game console, etc. using the user's finger or a touch pen while viewing the touch screen, and thus its applications are wide.

Generally, methods for implementing a touch screen include an electrical method and an optical method. The electrical scheme may provide a resistive film type touch screen or an electrostatic capacity type touch screen. The resistive film type and the electrostatic capacity type touch screens increase in cost and have more technical problems as the size is increased, and thus they are usually manufactured as small touch screens.

The optical method may use an infrared matrix, a camera, or the like. The infrared matrix may be used for a medium/large touch screen. However, as a size of the touch screen becomes larger, power consumption and cost are increased and more malfunctions occur due to environmental conditions such as sunlight and lighting.

A camera-based touch screen may calculate location coordinates of a touching object on the basis of angles of images of the touching object captured by two cameras. Similar to the infrared matrix-based touch screen, the camera-based touch screen may have malfunction problems due to the environmental conditions such as sunlight, lighting, and the like. In addition, the angles of the images of the touching object captured by each camera may be inaccurate due to measurement errors caused by distortion of camera lenses. Further, in detecting two or more touches in the touch screen, it is difficult to identify a calculative ghost point, if any.

Technical Problem

The following description relates to an optical touch screen that can obtain accurate coordinates of an object being touched in a touch screen without measurement errors caused by distortion of a camera lens and without being affected by the sunlight, a shadow, the exterior light, or the like.

In addition, the following description relates to an optical touch screen that can obtain accurate actual coordinates of two or more touches by distinguishing ghost point coordinates that are only introduced for calculation in detecting the multi-touch.

Technical Solution

The present invention provides an optical touch screen comprising: a main body configured to enclose edges of a touch area of a screen; fine coordinate infrared light source generators configured to be arranged on each of two horizontal sides and two longitudinal sides of the main body and facing toward the touch area so as to generate a plurality of infrared light sources forming fine coordinates at a predefined spacing and to provide references for coordinates in a horizontal axis and a vertical axis of the touch area; two or more infrared cameras configured to be installed in the main body to detect the infrared light sources forming fine coordinates generated by the fine coordinate infrared light source generators; and a control unit configured to calculate coordinates of an object being touched in the touch area on the basis of detection data obtained by the infrared cameras.

Additional features of the invention will be set forth in the description which follows, and in part will be apparent from the description, or may be learned by practice of the invention.

Advantageous Effects

According to the present invention, infrared light sources forming fine coordinates are generated toward a touch area and positions of the infrared light sources blocked by a touching object are detected to obtain coordinates of the touching object, so that the coordinates of the touching object can be stably obtained without measurement error caused by aberration and distortion of a camera lens and without being affected by the sunlight, a shadow, the exterior light, or the like.

In addition, according to the present invention, a fine coordinate infrared light source generator distributes light from one or two infrared light emitting unit over the same number of infrared light sources forming fine coordinates as fine grooves, so that it is possible to reduce power consumption and make it easy to manufacture a large-sized touch screen. Further, in the occurrence of two or more touches in a touch screen, a ghost point that is only introduced for calculation can be accurately identified and thus it is possible to detect accurate actual coordinates of the touching object.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a diagram illustrating an example of a lookup table.

MODE FOR INVENTION

Figure 1:
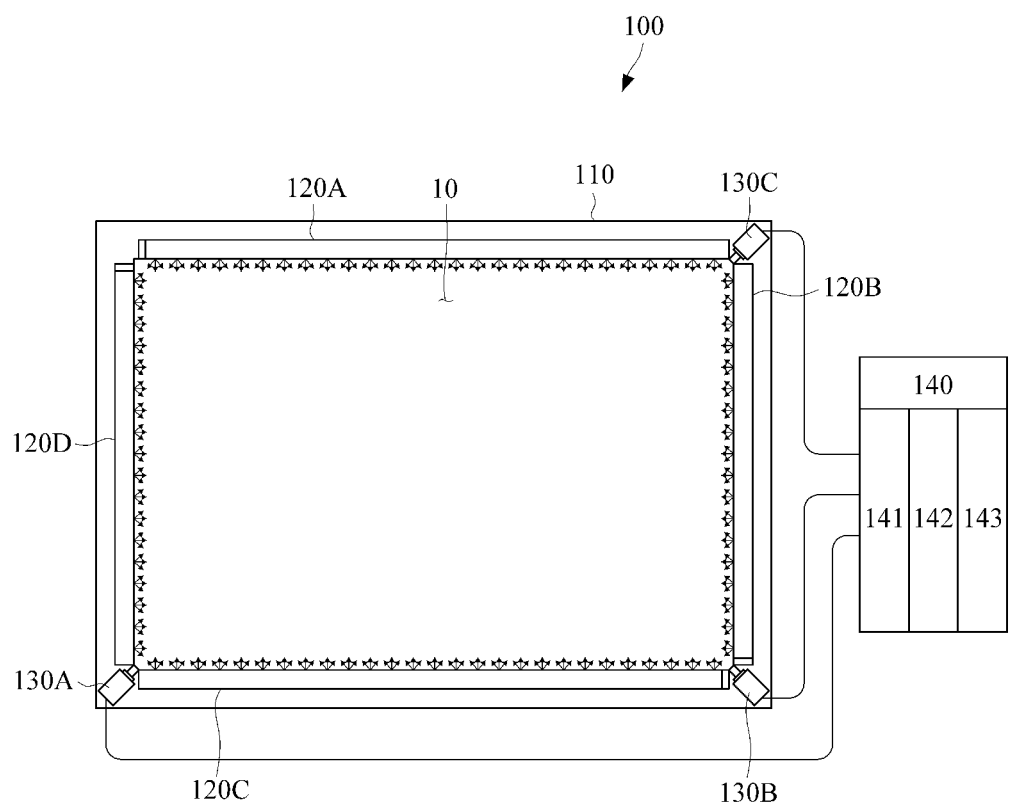
FIG. 1 is a diagram illustrating a configuration of an optical touch screen according to an exemplary embodiment.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a diagram illustrating a configuration of an optical touch screen according to an exemplary embodiment. Referring to FIG. 1, the optical touch screen 100 includes a main body 110, fine coordinate infrared light source generators for generating infrared light sources forming fine coordinates 120A, 120B, 120C, and 120D, infrared cameras 130A, 130B, and 130C, and a control unit 140.

The main body 110 encloses edges of a touch area 10 of a screen. The touch area 10 may be a touch screen area of a variety of display devices including a liquid crystal display (LCD) device. The main body 110 supports the fine coordinate infrared light source generators 120A, 120B, 120C, and 120D and the infrared cameras 130A, 130B, and 130C, which are mounted thereon.

The fine coordinate infrared light source generators 120A, 120B, 120C, and 120D provide references for coordinates in a horizontal axis and a vertical axis of the touch area 10. The fine coordinate infrared light source generators 120A, 120B, 120C, and 120D are each installed on each of two horizontal and two vertical sides of the main body 110.

The fine coordinate infrared light source generators 120A, 120B, 120C, and 120D generate a plurality of infrared light sources forming fine coordinates at a predefined spacing toward the touch area 10 from four inner sides of the main body 110. Light emission portions of the infrared light sources forming fine coordinates are positioned above the touch area 10, and disposed on the four sides of the touch area 10 in a certain alignment. Accordingly, the infrared light sources forming fine coordinates can function as references for coordinates in a horizontal axis and a vertical axis on the touch area 10.

The infrared cameras 130A, 130B, and 130C, which are cameras that are sensitive to infrared light, are installed in the main body 110 to detect the infrared light sources forming fine coordinates generated by the fine coordinate infrared light source generators 120A, 120B, 120C, and 120D. Although the optical touch screen 100 shown in FIG. 1 includes three infrared cameras, there may be provided two, four, or more infrared cameras in another example.

Each of the infrared cameras 130A, 130B, and 130C may include a lens and an image sensor. The lens may have a field of view of 90 degrees or more. The image sensor converts an optical image of an object that is formed on the image sensor by a lens into an electrical signal. The image sensor may be a charge-coupled device (CCD) image sensor or a complementary metal-oxide semiconductor (CMOS) image sensor.

The infrared cameras 130A, 130B, and 130C may detect locations of the infrared light sources forming fine coordinates that are blocked by an object being touched in the touch area 10, and provide the control unit 140 with the detected data. Then, the control unit 140 calculates location coordinates of the object being touched in the touch area 10 based on the data detected by the infrared cameras 130A, 130B, and 130C.

As described above, since the infrared light sources forming fine coordinates are generated toward the touch area 10 and the location coordinates of the touching object is calculated based on the detected location of the infrared light source blocked by the touching object, the location coordinates of the touching object can be stably obtained without measurement error caused by aberration and distortion of a camera lens and without being affected by the sunlight, a shadow, the exterior light, or the like.

Figure 2:
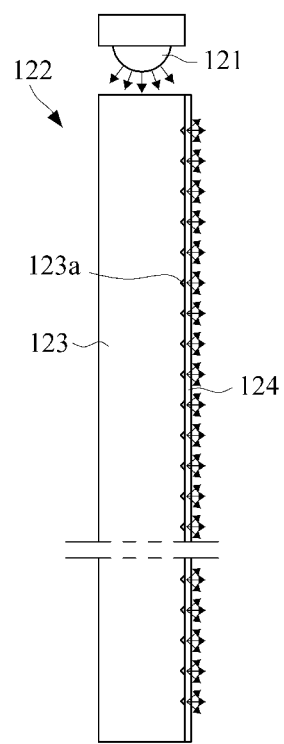
FIG. 2 is a diagram illustrating a front view of an example of a fine coordinate infrared light source generator.
Figure 3:
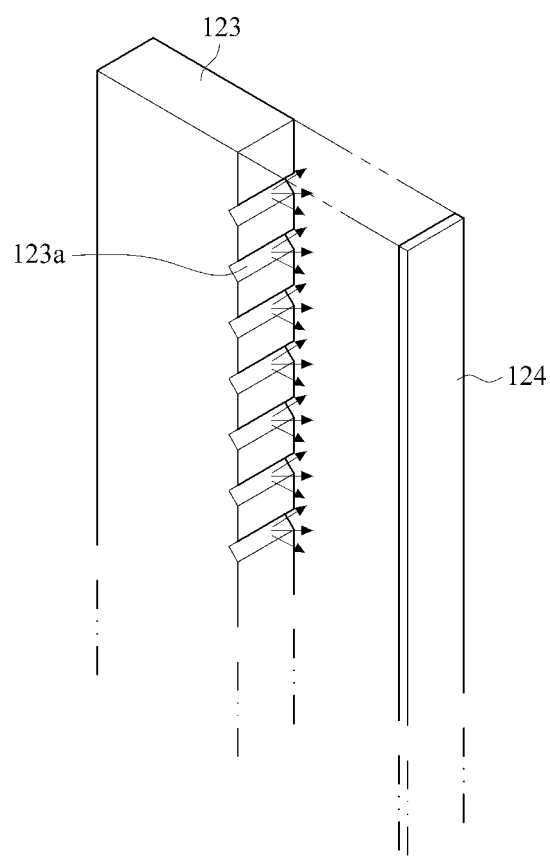
FIG. 3 is a diagram illustrating a perspective view of a part of the fine coordinate infrared light source generator of FIG. 2.

As shown in FIGS. 2 and 3, each of the fine coordinate infrared light source generators 120A, 120B, 120C, and 120D may include at least one infrared light emitting unit 121 and a fine-coordinate-light source distributor 122. The infrared light emitting unit 121 may be an infrared light emitting diode (LED). The fine-coordinate-light source distributor 122 distributes infrared light from the infrared light emitting unit 121 to a plurality of infrared light sources forming fine coordinates at a predefined spacing.

As an example, the fine-coordinate-light source distributor 122 may include a transparent rod 123 and a diffusion unit 124. The transparent rod 123 may be made of a transparent plastic or glass substance. The transparent rod 123 may have the infrared emitting unit 121 disposed on at least one end. The transparent rod 123 may have a rectangular cross-section.

The transparent rod 123 may have fine grooves 123a on one side at predetermined space intervals along the length thereof. The light from the infrared light emitting unit 121 that passes into one end of the transparent rod 123 is diffuse reflected by the fine grooves 123a, thereby generating the infrared light sources forming fine coordinates. Accordingly, a plurality of infrared light sources forming fine coordinates at a predefined spacing can be generated from the transparent rod 123. Although not illustrated, the transparent rod 123 may have an additional infrared light emitting unit or a reflection mirror on the opposite end thereof so as to increase the brightness of the infrared light sources forming fine coordinates.

The diffusion unit 124 may be provided to enable the infrared light sources forming fine coordinates to emit from the fine grooves 123a evenly in all directions. The diffusion unit 124 may be a diffusion film. The diffusion film may have a diffuse reflection surface, and be attached on a portion of the transparent rod 123 where the fine grooves 123a are formed.

The fine coordinate infrared light source generators 120A, 120B, 120C, and 120D generate the infrared light sources forming fine coordinates by distributing the light from one or two infrared light emitting units 121 among the same number of infrared light sources forming fine coordinates as the fine grooves 123a, and thus can reduce power consumption and make it easy to manufacture a large-sized touch screen.

Figure 4:
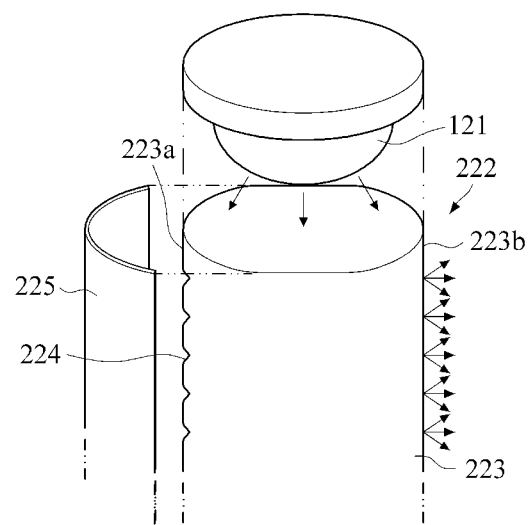
FIG. 4 is a diagram illustrating a perspective view of another example of the fine coordinate infrared light source generator.

As another example, as shown in FIG. 4, a transparent rod 223 of a fine-coordinate-light source distributor 222 may have fine grooves 224 at predetermined space intervals on one side 223a along a length direction, and generate infrared light sources forming fine coordinates at a predefined spacing on the other side 223b that is opposite to the side 223a having the fine grooves 224 formed thereon. The transparent rod 223 may have at least one infrared light emitting unit 121 disposed on at least one or each of ends.

The light from the infrared light emitting unit 121 passing into one end of the transparent rod 223 causes diffuse reflection on each fine groove 224. Some light diffuse reflected by the fine grooves 224 is focused as it enters through the transparent rod 223, and the focused light is emitted through an opposite side 223b of the transparent rod 223. Therefore, the infrared light sources forming fine coordinates can be generated at a predefined spacing on the opposite side 223b of the transparent rod 223. The transparent rod 223 is disposed such that the infrared light sources forming fine coordinates can face the touch area 10.

The side 223b of the transparent rod 223 on which the infrared light sources forming fine coordinates are disposed may have a surface formed to be curved, which can function as a lens. Accordingly, some light diffuse reflected by the fine grooves 224 can be more effectively focused on the side 223b of the transparent rod 223 as it passes through the transparent rod 223 toward the side 223b.

In addition, the transparent rod 223 may have the side 223a formed to be curved, on which the fine grooves 224 are arranged. Accordingly, some light diffuse reflected by the fine grooves 224 can be focused inside the transparent rod 223, so that the intensity of light emitting from the opposite side 223b of the transparent rod 223 can be increased.

The transparent rod 223 may further include a reflection member 225 on the side 223a where the fine grooves 224 are arranged. The reflection member 225 may reflect the light toward the transparent rod 223 as the light is diffuse reflected by the fine grooves 224 and propagates toward the exterior, and thus the brightness of the infrared light sources forming fine coordinates can be increased.

Figure 5:
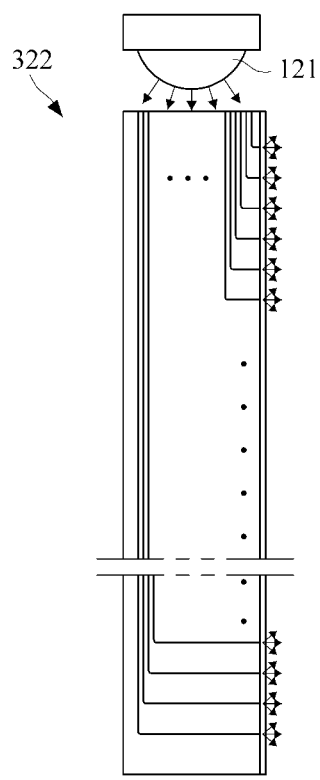
FIG. 5 is a diagram illustrating a front view of another example of the fine coordinate infrared light source generator.
Figure 6:
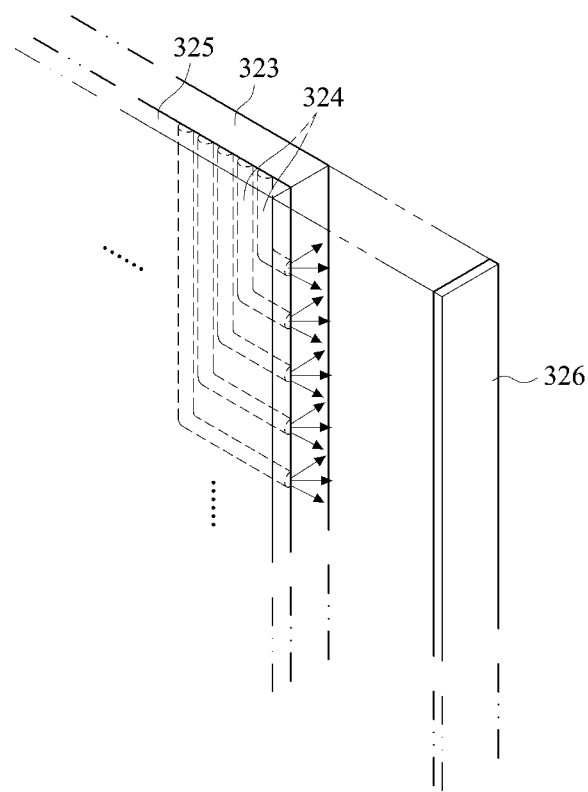
FIG. 6 is a diagram illustrating a perspective view of a part of the fine coordinate infrared light source generator of FIG. 5.

As another example, as shown in FIGS. 5 and 6, a fine-coordinate-light distributor 322 may include a base film 323, optical paths 324, a coating film 325, and a diffusion unit 326. The base film 323 may be a film having a low refractive index. The optical paths 324 on the base film 323 may be made of transparent resin having a high refractive index, being spaced predetermined intervals from each other. The optical paths 324 may be formed by printing or etching on the base film 323.

The coating film 325 may be made of resin having a low refractive index to cover the optical paths 324. The coating film 325 may cover the entire base film 323. The diffusion unit 326 enables the infrared light sources forming fine coordinates to emit from the optical paths 324 evenly in all directions. The diffusion unit 326 may be a diffusion film having a diffuse reflection surface, and be attached to a portion of the fine-coordinate-light distributor 322 where the infrared light sources forming fine coordinates emit.

When light from the infrared light emitting unit 121 enters at least one side of the base film 323, total reflection of the light occurs in each optical path 324 and the reflected light arriving at an emission end of the optical path 324 is diffused and emitted by the diffusion unit 326. Thus, the light from the infrared light emitting unit 121 can be distributed over the same number of infrared light sources forming fine coordinates as the optical paths 324, which are disposed at predetermined space intervals.

Referring back to FIG. 1, three infrared cameras 130A, 130B, and 130C are disposed on each of three corners of the main body 110. For example, the infrared cameras 130A, 130B, and 130C may be, respectively, placed in the lower left corner, the lower right corner, and the upper right corner. The infrared cameras 130A, 130B, and 130C may be disposed to have their centers placed at an angle of 45 degrees relative to the horizontal and vertical sides of the main body 110. As a result, the infrared cameras 130A, 130B, and 130C enable to detect the infrared light sources forming fine coordinates that are generated by the fine coordinate infrared light source generators 120A, 120B, 120C, and 120D disposed on facing horizontal and vertical sides of the main body 110.

The control unit 140 may include a camera interface 141, a memory 142, and a calculating unit 143. The memory 142 stores beforehand a lookup table as shown in FIG. 7. The lookup table may be generated as described below. The lengths of the inner horizontal sides and vertical sides of the main body 110 having the four fine coordinate infrared light source generators 120A, 120B, 120C, and 120D installed on each side are set at the time of manufacturing. Further, the positions of the infrared light sources forming fine coordinates that are generated by the fine coordinate infrared light source generators 120A, 120B, 120C, and 120D are initially set at the time of manufacturing of the main body 110.

Figure 8:
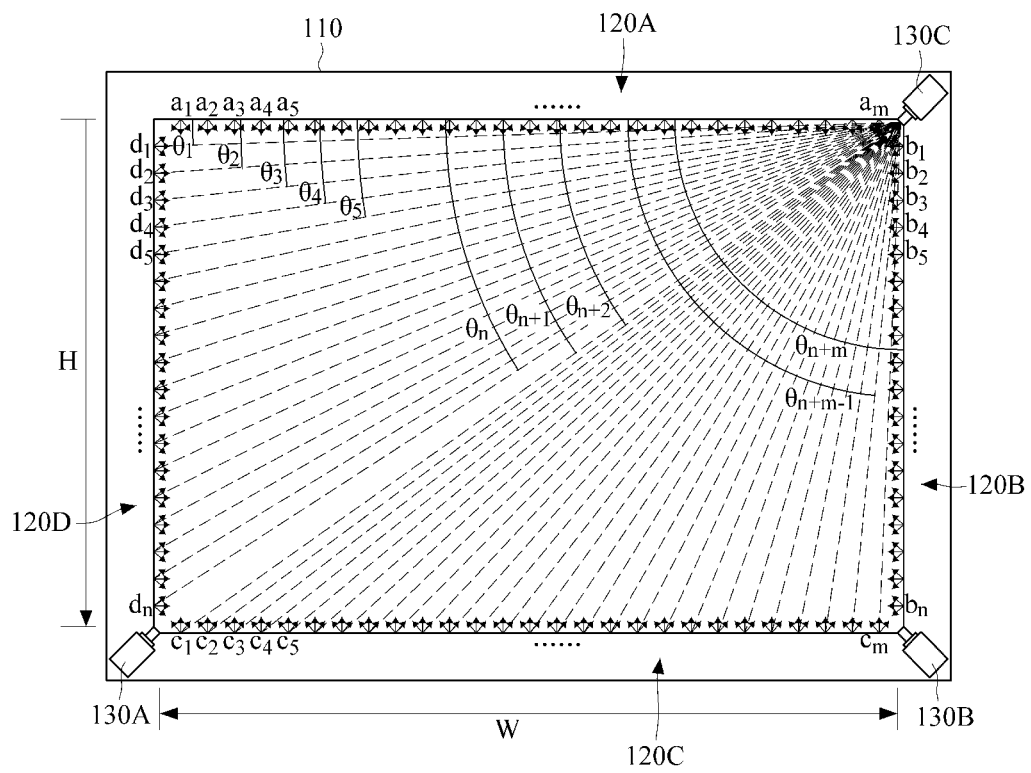
FIG. 8 is a diagram for explaining an example of measuring angles of positions of each fine coordinate infrared light source using infrared cameras.

Thus, angles of the positions of each infrared light source relative to the positions of the three infrared cameras 130A, 130B, and 130C can be previously measured. That is, as shown in FIG. 8, the infrared camera 130C in the upper right corner can measure angles of positions of n infrared light sources forming fine coordinates $d_1$ to $d_n$ that are generated by the fine coordinate infrared light source generator 120D placed on the opposite left vertical side and angles of positions of m infrared light sources forming fine coordinates $c_1$ to $c_m$ that are generated by the fine coordinate infrared light source generator 120C placed on the opposite lower horizontal side.

Likewise, the infrared camera 130A in the lower left corner and the infrared camera 130B in the lower right corner can measure angles of positions of corresponding infrared light sources forming fine coordinates. Based on the above measurement, the lookup table may be made using the position numbers assigned to the respective infrared light sources forming fine coordinates as index values and the angles of the positions of the respective infrared light sources forming fine coordinates measured by the three infrared cameras 130A, 130B, and 130C as table values. The lookup table is stored in the memory 142 in advance.

Figure 9:
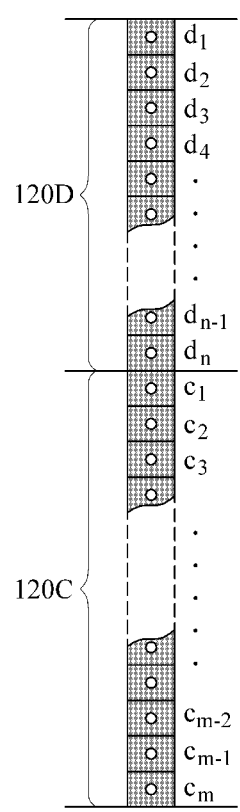
FIG. 9 is a diagram illustrating an example of a column of fine coordinate infrared light sources being detected by an image sensor.

The memory 142 stores beforehand address maps. The address maps are made as described below. The infrared camera 130C in the upper right corner are detecting both n infrared light sources forming fine coordinates $d_1$ to $d_n$ that are generated by the fine coordinate infrared light source generator 120D on the opposite left vertical side and m infrared light sources forming fine coordinates $c_1$ to $c_m$ that are generated by the fine coordinate infrared light source generator 120C on the opposite lower horizontal side. Hence, the image sensor 131 included in the infrared camera 130C in the upper right corner detects n+m infrared light sources forming fine coordinates $d_1$ to $c_m$ as a single column, as shown in FIG. 9.

In the similar manner, the image sensor included in the infrared camera 130A in the lower left corner detects n+m infrared light sources forming fine coordinates $b_n$ to $b_1$ and $a_m$ to $a_1$. In addition, the image sensor included in the infrared camera 130B in the lower right corner detects n+m infrared light sources forming fine coordinates $d_n$ to $d_1$ and $a_1$ to $a_m$.

Image data detected by the image sensors of the infrared cameras 130A, 130B, and 130C are transmitted to the control unit 140 through the camera interface 141. The control unit 140 searches for data addresses of pixels of the image sensor that are exposed to light by the infrared light sources forming fine coordinates and assigns identification numbers to the found data addresses. The control unit 140, then, matches the identification numbers with the position numbers of the infrared light sources forming fine coordinates to generate the address maps for the infrared light sources forming fine coordinates. The generated address maps are stored in the memory 142 in advance.

An angle of a touch position may be calculated using the lookup table and the address maps that are present in the memory 142. In the occurrence of a touch on the touch area 10 with a touching object such as a finger, the infrared cameras 130A, 130B, and 130C cannot receive the infrared light sources forming fine coordinates that are blocked by the touching object among the infrared light sources forming fine coordinates generated toward the touch area 10. Thus, pixels of the image sensor of each of the infrared cameras 130A, 130B, and 130C, corresponding to the blocked infrared light sources forming fine coordinates, are stopped being exposed to light.

The calculating unit 143 periodically checks pixels on the address maps for light exposure data, and if there are pixels that stop being exposed to light, the calculating unit 143 reads the position numbers of the corresponding infrared light sources forming fine coordinates from the address maps by use of the identification numbers assigned to the addresses of the pixels. Thereafter, the calculating unit 143 obtains the angle values of the positions of the corresponding infrared light sources forming fine coordinates from the lookup table present in the memory 142.

Figure 10:
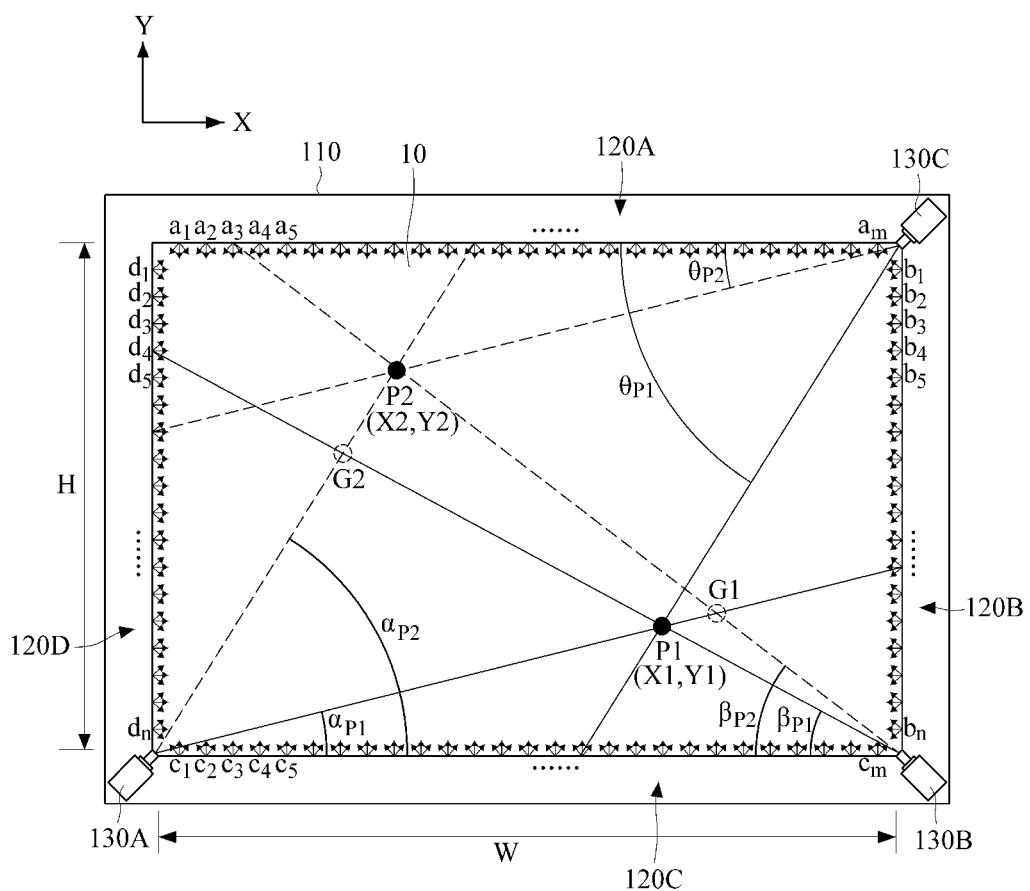
FIG. 10 is a diagram for explaining a process of obtaining touch coordinates.

The calculating unit 143 calculates the coordinates of the touching object based on the obtained angle values. The coordinates of the touching object may be calculated as described below. As shown in FIG. 10, given a position of a touch is P1 on the touch area 10, the calculating unit 143 obtains angles $\alpha_{P1}$ and $\beta_{P1}$ corresponding to the position P1 from the lookup table. $\alpha_{P1}$ is an angle acquired by the infrared camera 130A in the lower left corner and $\beta_{P1}$ is an angle acquired by the infrared camera 130B in the lower right corner.

Coordinates of the position P1 may be obtained by Equation 1 below where a length of an inner horizontal side of the main body 110 in an X-axis direction is W and a length of an inner vertical side of the main body 110 in a Y-axis direction is H.

$$X1 = W \times \frac{\tan\beta_{P1}}{\tan\alpha_{p1} + \tan\beta_{P1}}, Y1 = W \times \frac{\tan\alpha_{p1} \times \tan}{\tan\alpha_{p1} + \tan} \quad (1)$$

When multi touch occurs on the touch area 10, the calculating unit 143 calculates coordinates of the touching point based on angle values obtained by two (for example, 130A and 130B) of the three infrared cameras 130A, 130B, and 130C, and distinguishes actual point coordinates and ghost point coordinates based on the calculated coordinates of the touching object and the angle values obtained by the remaining infrared camera (for example, 130C).

For example, given that the positions of the multi touches are P1 and P2, coordinates (X1, Y1) of the position P1 and coordinates (X2, Y2) of the position P2 are obtained as described below. Angles $\alpha_{P1}$ and $\alpha_2$ obtained by the infrared camera 130A in the lower left corner and angles $\beta_{P1}$ and $\beta_{P2}$ obtained by the infrared camera 130B produce four intersecting points as they are crossing each other. The four intersecting points includes P1 that is an intersecting point of $\alpha_{P1}$ and $\beta_{P1}$, P2 that is an intersecting point of $\alpha_{P2}$ and $\beta_{P2}$, G1 that is an intersecting point of $\alpha_{P1}$ and $\beta_{P2}$, and G2 that is an intersecting point of $\alpha_{P2}$ and $\beta_{P1}$. P1 and P2 are the actual points of the touching object and G1 and G2 are "ghost" points that are only introduced for calculation.

G1 and G2 are not present on lines of angles of $\theta_{P1}, \theta_2$ that are detected by the infrared camera 130C in the upper right corner, and thus they are ghost points. The actual point coordinates can be distinguished from the ghost point coordinates as described below.

The calculating unit 143 calculates coordinate values of P1, P2, G1 and G2 by applying $\alpha_{P1}$, $\alpha_{P2}$, $\beta_{P1}$, and $\beta_{P2}$ to Equation 1. Then, the calculating unit 143 substitutes a coordinate value of P1 for (X,Y), another coordinate value of G1 for (X,Y), and an angle value of $\theta P1$ for $\theta$ in Equation 2 below. The calculating unit 143 makes a determination that the actual point coordinates are obtained if the right side is the same as the left side of Equation 2, and makes a determination that the ghost point coordinates are obtained if the right side is different from the left side of Equation 2. In the same manner, the calculating unit 143, respectively, substitutes a coordinate value of P2 for (X,Y) and a coordinate value of G2 for (X,Y) and an angle value of $\theta_{P2}$ for $\theta$ in Equation 2. The calculating unit 143 makes a determination that actual point coordinates are obtained if the right side is the same as the left side of Equation 2, and makes a determination that ghost point coordinates are removed if the left side is different from the right side of Equation 2.

$$\tan\theta = \frac{H-Y}{W-X} \quad (2)$$

If three or more touches are made in the touch area 10, the ghost point coordinates are removed by the same method as described above, and the actual point coordinates can be acquired.

In addition, there may be provided only two infrared cameras in an effort to reduce cost for manufacturing the optical touch screen 100. The two infrared cameras are disposed to diagonally face each other in each of two corners, among the four corners of the main body 110, and the infrared cameras are installed to detect all infrared light sources forming fine coordinates that are generated toward the touch area 10. For example, amongst the three infrared cameras 130A, 130B, and 130C, the infrared camera 130B in the lower right corner may be omitted.

It also may be possible to install two infrared cameras in each of adjacent two corners of the main body 110 such that the infrared cameras can detect infrared light sources forming fine coordinates generated on diagonally opposite horizontal and vertical sides of the main body 110. For example, amongst the three infrared cameras 130A, 130B, and 130C, the infrared camera 130C in the upper right corner may be omitted.

As another example, the optical touch screen 100 may include four infrared cameras for more accurate identification of the coordinates of multi-touches. In this example, the four infrared cameras may be provided in each of four corners of the main body 110 so as to detect all infrared light sources forming fine coordinates that are generated toward the touch area 10.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. An optical touch screen comprising:
    a main body configured to enclose edges of a touch area of a screen;
    fine coordinate infrared light source generators configured to be arranged on each of two horizontal sides and two longitudinal sides of the main body and facing toward the touch area so as to generate a plurality of infrared light sources forming fine coordinates at a predefined spacing and to provide references for coordinates in a horizontal axis and a vertical axis of the touch area;
    two or more infrared cameras configured to be installed in the main body to detect the infrared light sources forming fine coordinates generated by the fine coordinate infrared light source generators; and
    a control unit configured to calculate coordinates of an object being touched in the touch area on the basis of detection data obtained by the infrared cameras, wherein:
    the control unit comprises:
        a memory configured to store a lookup table having position numbers as index values, which are assigned to all infrared light sources forming fine coordinates, and angles of positions of the infrared light sources forming fine coordinates as table values, which are measured by the three infrared cameras, and store address maps that are generated by matching identification numbers assigned to addresses of pixels on image sensors of each of the infrared cameras with the position numbers wherein the pixels are exposed to light by the infrared light sources forming fine coordinates and
        a calculating unit configured to periodically check the pixels on the address maps that correspond to the identification numbers for light exposure data, and if there are pixels that stop being exposed to light, read the position numbers of corresponding infrared light sources forming fine coordinates from the address maps by use of the identification numbers assigned to the addresses of the pixels, obtain the angle values of the corresponding infrared light sources forming fine coordinates from the lookup table and calculate the coordinates of the touching object based on the obtained angle value.

2. The optical touch screen of claim 1, wherein each of the fine coordinate infrared light source generators comprises at least one infrared light emitting unit and a fine-coordinate-light source distributor configured to distribute light emitted from the infrared light emitting unit to the infrared light sources forming fine coordinates at a predefined spacing.

3. The optical touch screen of claim 2, wherein the fine-coordinate-light source distributor comprises a transparent rod having the infrared light emitting unit on at least one end and having fine grooves formed at a predefined spacing on one side along a length direction, and a diffusion unit configured to enable the infrared light sources forming fine coordinates from the fine grooves to emit evenly in all directions.

4. The optical touch screen of claim 2, wherein the fine-coordinate-light source distributor comprises a base film having a low refractive index, optical paths formed of transparent resin having a high refractive index and disposed at a predefined spacing on the base film, a coating film made of resin having a low refractive index to cover all the optical paths on the base film, and a diffusion unit configured to enable the infrared light sources forming fine coordinates from the optical paths to emit evenly in all directions.

5. The optical touch screen of claim 2, wherein the fine-coordinate-light source distributor comprises a transparent rod having the infrared light emitting unit on one end, having fine grooves formed at a predefined spacing on one side along a length direction, and allowing light diffuse-reflected by the fine grooves to generate the infrared light sources forming fine coordinates at a predefined spacing on the other side.

6. The optical touch screen of claim 5, wherein the side of the transparent rod on which the infrared light sources forming fine coordinates are generated has a curved surface to function as a lens.

7. The optical touch screen of claim 6, wherein the side of the transparent rod on which the fine grooves are formed has a curved surface so that the light diffuse-reflected by the fine grooves is focused inside the transparent rod.

8. The optical touch screen of claim 7, wherein the transparent rod further comprises a reflection member on the side where the fine grooves are formed.

9. The optical touch screen of claim 1, wherein there are provided three infrared cameras which are placed in each of three corners of the main body such that centers of each of the infrared cameras are placed at an angle of 45 degrees relative to the horizontal and vertical sides of the main body.

10. The optical touch screen of claim 1, wherein when multi-touch occurs, the calculating unit calculates the coordinates of the touching object based on angle values obtained by two of the three infrared cameras, and distinguishes actual point coordinates and ghost point coordinates of the touching object on the basis of the calculated coordinates of the touching object and angle values obtained by the remaining infrared camera.

* * * * *